(12) United States Patent
Han et al.

(10) Patent No.: US 12,021,790 B2
(45) Date of Patent: Jun. 25, 2024

(54) UPLINK TRANSMISSION METHOD AND DEVICE

(71) Applicant: Huawei Technologies Co., Ltd., Shenzhen (CN)

(72) Inventors: Jing Han, Beijing (CN); Xuesong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 371 days.

(21) Appl. No.: 17/380,320

(22) Filed: Jul. 20, 2021

(65) Prior Publication Data

US 2021/0391969 A1 Dec. 16, 2021

Related U.S. Application Data

(63) Continuation of application No. PCT/CN2020/073329, filed on Jan. 20, 2020.

(30) Foreign Application Priority Data

Jan. 21, 2019 (CN) .......................... 201910054666.8

(51) Int. Cl.
*H04W 24/10* (2009.01)
*H04L 5/00* (2006.01)
*H04W 72/044* (2023.01)

(52) U.S. Cl.
CPC .......... *H04L 5/0082* (2013.01); *H04L 5/0032* (2013.01); *H04L 5/0042* (2013.01); *H04W 24/10* (2013.01); *H04W 72/044* (2013.01)

(58) Field of Classification Search
CPC ... H04L 5/0082; H04L 5/0032; H04L 5/0042; H04L 5/0007; H04L 27/0006; H04W 24/08; H04W 24/10; H04W 36/0088; H04W 72/044; H04W 72/1268; H04W 72/23; H04W 56/0045
See application file for complete search history.

(56) References Cited

U.S. PATENT DOCUMENTS 11,089,539 B2   8/2021 Zeng et al.
2014/0146907 A1*  5/2014 Kim ..................... H04W 72/23
                                                    375/267

(Continued)

FOREIGN PATENT DOCUMENTS

CN   101790188 A   7/2010
CN   104823387 A   8/2015

(Continued)

OTHER PUBLICATIONS

ZTE, "Discussion on UL transmission after measurement gap", 3GPP TSG-RAN WG4 Meeting #88, R4-1810742, Gothenburg, Sweden, Aug. 20-24, 2018, 4 pages.
Huawei et al., "UE UL transmission behavior after MG", 3GPP TSG-RAN WG4 Meeting #90, R4-1901158, Athens, Greece, Feb. 25-Mar. 1, 2019, 3 pages.

(Continued)

*Primary Examiner* — Siu M Lee
(74) *Attorney, Agent, or Firm* — Slater Matsil, LLP

(57) ABSTRACT

Embodiments of this application provide an uplink transmission method and a device. A terminal performs measurement in a measurement gap; and the terminal determines whether to conduct uplink sending in a period of time. The period of time starts from the end of the measurement gap, and length of the period of time is determined by the terminal based on a communication parameter.

18 Claims, 8 Drawing Sheets

---

A terminal performs measurement in a measurement gap — S301

The terminal determines whether to perform uplink sending in a period of time, where the period of time is a time period starting from the end of the measurement gap, and duration of the period of time is determined by the terminal based on a communication parameter — S302

(56) References Cited

U.S. PATENT DOCUMENTS

| | | | |
|---|---|---|---|
| 2018/0302195 A1 | 10/2018 | Kim et al. | |
| 2019/0124533 A1* | 4/2019 | Tenny | H04L 5/0091 |
| 2019/0357224 A1* | 11/2019 | Li | H04L 5/0055 |
| 2021/0227413 A1* | 7/2021 | Yang | H04W 72/0446 |
| 2021/0345323 A1* | 11/2021 | Axmon | H04W 72/12 |

FOREIGN PATENT DOCUMENTS

| | | | |
|---|---|---|---|
| CN | 105282766 A | 1/2016 | |
| CN | 108282879 A | 7/2018 | |
| CN | 109217995 A | 1/2019 | |
| EP | 2296296 A1 * | 3/2011 | H04W 74/08 |

OTHER PUBLICATIONS

3GPP TS 38.133 V15.4.0, 3rd Generation Partnership Project, Technical Specification Group Radio Access Network, NR, Requirements for support of radio resource management(Release 15), (Dec. 2018), 876 pages.

3GPP TS 36.133 V16.0.0, 3rd Generation Partnership Project, Technical Specification Group Radio Access Network, Evolved Universal Terrestrial Radio Access (E-UTRA), Requirements for support of radio resource management (Release 16), (Dec. 2018), 3563 pages.

Huawei et al., "Further discussion on UE behavior around MG", 3GPP TSG-RAN WG4 Meeting #89, R4-1815163, Nov. 12-16, 2018, 2 pages, Spokane, US.

ZTE, "CR to 38.133 on UE behaviour before and after measurement gap (section 9.1.2)" 3GPP TSG-RAN WG4 Meeting #89, R4-1816677, Nov. 12-16, 2018, 8 pages, Spokane, US.

* cited by examiner

UPLINK TRANSMISSION METHOD AND DEVICE

CROSS-REFERENCE TO RELATED APPLICATIONS

This application is a continuation of International Application No. PCT/CN2020/073329, filed on Jan. 20, 2020, which claims priority to Chinese Patent Application No. 201910054666.8, filed on Jan. 21, 2019. The disclosures of the aforementioned applications are hereby incorporated by reference in their entireties.

TECHNICAL FIELD

Embodiments of this application relate to the field of communication technologies, and in particular, to an uplink transmission method and a device.

BACKGROUND

In a new radio (NR) technology, in some scenarios, when a to-be-measured target frequency is not in an operating bandwidth of a terminal, and the terminal measures the target frequency, a simple method is to install two types of radio frequency receivers in the terminal, to separately measure a current frequency and the target frequency of the terminal. However, this increases costs and causes interference between different frequencies. Therefore, a measurement gap (MG) is proposed in 3GPP, that is, a period of time (that is, the measurement gap) is reserved in a normal process of sending and receiving data. In this period of time, the terminal sends or receives no data. Instead, the terminal adjusts a receiver to a target frequency, and measures the target frequency. After the measurement gap ends, the terminal switches the receiver to a current frequency and continues to send and receive the data.

Currently, an existing time interval between the end of the measurement gap and a time point for uplink sending is a fixed value, which is not applicable to the NR technology. Therefore, for the NR technology, an uplink sending behavior after the end of the measurement gap urgently needs to be standardized.

SUMMARY

Embodiments of this application provide an uplink transmission method and a device, to standardize an uplink sending behavior after a measurement gap ends, so that uplink sending does not affect measurement in the measurement gap and resources are not wasted.

According to a first aspect, an embodiment of this application provides an uplink transmission method, and the method includes the following. A terminal performs measurement in a measurement gap; and the terminal determines whether to conduct uplink sending in a period of time, where the period of time starts from the end of the measurement gap, the period of time is adjacent to the measurement gap and is located after the measurement gap, and the period of time may be a time period in a time unit of a subframe, a slot, a symbol, or the like; or may be a time period in a time unit of milliseconds, microseconds, or the like. Length of the period of time is determined by the terminal based on a communication parameter, where the communication parameter may be a parameter used to represent a cell coverage area or an actual distance between a terminal and a network device.

Optionally, when a slot partially overlapped with the measurement gap is caused because the measurement gap is advanced, the period of time is adjacent to the slot partially overlapped with the measurement gap, and is located after the slot. The period of time may be a time period in a time unit of a subframe, a slot, a symbol, or the like; or may be a time period in a time unit of milliseconds, microseconds, or the like. The length of the period of time is determined by the terminal based on the communication parameter, where the communication parameter may be a parameter used to represent the cell coverage area or the actual distance between the terminal and the network device.

Because the length of the period of time is determined based on the communication parameter, the length of the period of time is not a determined value, and may be flexibly determined based on the communication parameter. When the terminal does not conduct uplink sending in the period of time according to implementation, a case in which the terminal conducts uplink sending in the measurement gap due to a timing advance of the terminal is avoided, and a resource waste caused by the terminal not conducting uplink sending for a long time after the measurement gap ends is avoided.

In a possible design of the first aspect, the communication parameter is a timing advance of the terminal, and there is a mapping relationship between the timing advance and the length, where if a first timing advance is less than a second timing advance, first length corresponding to the first timing advance is not greater than second length corresponding to the second timing advance. For example, the timing advance and the length may be positively related, that is, a larger timing advance indicates longer length, to prevent the terminal from conducting uplink sending in the measurement gap.

In a possible design of the first aspect, the length is a step function of the timing advance, and if $TA \in [0, a-x)$, $TL=a$; or if $TA \in [a-x, b-x]$, $TL=b$, where TA is the timing advance, TL is the length, $a=Ns$, $b=a+Ms$, N and M are positive integers, s is half a slot length, one slot length, or one symbol length, X is a margin, and a length of X is a length of a cyclic prefix CP.

The length of the period of time is determined based on the timing advance, and the length is greater than the timing advance. Therefore, when the terminal determines not to conduct uplink sending in the period of time, and conducts uplink sending after the period of time ends, a timing advance operation of the terminal does not affect measurement performed by the terminal in the measurement gap, and it is also ensured that the terminal can conduct uplink sending in a timely manner, thereby improving resource utilization.

In a possible design of the first aspect, the communication parameter is parameter information of a serving cell of the terminal, and the parameter information of the serving cell includes one or a combination of the following: a subcarrier spacing or a frequency range.

In a possible design of the first aspect, there is a mapping relationship between the subcarrier spacing and the length, and if a first subcarrier spacing is greater than a second subcarrier spacing, first length corresponding to the first subcarrier spacing is not greater than second length corresponding to the second subcarrier spacing.

There is a mapping relationship between the frequency range and the length, and if a frequency band corresponding to a first frequency range is higher than a frequency band corresponding to a second frequency range, first length corresponding to the first frequency range is not greater than second length corresponding to the second frequency range. The subcarrier spacing and the length may be negatively related, that is, a larger subcarrier spacing indicates shorter length. The mapping relationship between the subcarrier spacing and the length may also be a step function.

The length of the period of time is determined based on the subcarrier spacing or the frequency range, and a maximum cell radius that may be supported in a specific subcarrier spacing or frequency range is mainly considered. Therefore, when the terminal determines not to conduct uplink sending in the period of time, and conducts uplink sending after the period of time ends, the timing advance of the terminal does not affect measurement performed by the terminal in the measurement gap, and it is also ensured that the terminal can conduct uplink sending in a timely manner, thereby improving resource utilization.

In a possible design of the first aspect, the communication parameter is a first message, and the method further includes the following. The terminal receives the first message sent by the network device, where the first message is used to indicate the length. The first message may be configuration information, indication information, or other communication information between the terminal and the network device. An indication field is set in the first message, and the indication field is used to explicitly indicate the length.

The length is explicitly indicated by using the first message, so that the terminal can efficiently and directly obtain the length, thereby improving processing efficiency of the terminal.

In a possible design of the first aspect, the communication parameter is a guard period for downlink to uplink switching, and the method further includes the following. The terminal receives a second message sent by the network device, where the second message carries the guard period, and the length is determined by the terminal based on the guard period. The second message may be a system message or a configuration message.

The length of the period of time is implicitly indicated by using the guard period carried in the second message, so that signaling overheads between the network device and the terminal device are not increased. The length is determined based on the communication parameter, that is, the length of the period of time is not a fixed value. When the terminal conducts uplink sending based on scheduling of the network device after the period of time ends, measurement in the measurement gap is not affected, and it is also ensured that the terminal can conduct uplink sending in a timely manner, thereby improving resource utilization.

In a possible design of the first aspect, if a plurality of serving cells are configured for the terminal, each serving cell corresponds to a period of time, where length of the period of time is determined based on a communication parameter of a corresponding serving cell; or all serving cells correspond to a period of time, where the period of time is determined based on a maximum value of a plurality of pieces of length determined based on communication parameters of all the serving cells; or each serving cell group corresponds to a period of time, where the period of time is determined based on a maximum value of a plurality of pieces of length determined based on communication parameters of all serving cells in the group; and the serving cell group is determined based on a frequency range in which each serving cell is located or a timing advance group in which each serving cell is located.

When the plurality of uplink serving cells are configured for the terminal, the terminal determines an implementation of the length of the period of time, so that in a scenario in which the plurality of serving cells are configured for the terminal, uplink sending performed by the terminal after the measurement gap does not affect measurement performed in the measurement gap, and it can also be ensured that the terminal can conduct uplink sending in a timely manner, thereby improving resource utilization.

According to a second aspect, an embodiment of this application provides an uplink transmission method, and the method includes the following. A network device generates scheduling information, where the scheduling information is used to schedule a terminal to conduct uplink transmission after a period of time ends, that is, the scheduling information is used to avoid scheduling the terminal to conduct uplink transmission in the period of time, where the period of time starts from the end of a measurement gap, length of the period of time is determined by the network device based on a communication parameter, and the measurement gap is a time period in which the terminal performs measurement.

The network device sends the scheduling information to the terminal.

The network device sends the scheduling information to the terminal device, to avoid scheduling the terminal to conduct uplink transmission in the period of time. The length of the period of time is determined based on the communication parameter, that is, the length of the period of time is not a fixed value, so that a resource that can be scheduled by the network device is determined. When the terminal conducts uplink sending based on scheduling of the network device after the period of time ends, measurement in the measurement gap is not affected, and it is also ensured that the terminal can conduct uplink sending in a timely manner, thereby improving resource utilization.

In a possible design of the second aspect, the communication parameter is a timing advance of the terminal, and there is a mapping relationship between the timing advance and the length, where if a first timing advance is less than a second timing advance, first length corresponding to the first timing advance is not greater than second length corresponding to the second timing advance.

In a possible design of the second aspect, the length is a step function of the timing advance, and if $TA \in [0, a-x)$, $TL=a$; or if $TA \in [a-x, b-x]$, $TL=b$, where TA is the timing advance, TL is the length, $a=Ns$, $b=a+Ms$, N and M are positive integers, s is half a slot length, one slot length, or one symbol length, X is a margin, and a length of X is a length of a cyclic prefix CP.

In a possible design of the second aspect, the communication parameter is parameter information of a serving cell of the terminal, and the parameter information of the serving cell includes one or a combination of the following: a subcarrier spacing or a frequency range.

In a possible design of the second aspect, there is a mapping relationship between the subcarrier spacing and the length, and if a first subcarrier spacing is greater than a second subcarrier spacing, first length corresponding to the first subcarrier spacing is not greater than second length corresponding to the second subcarrier spacing.

There is a mapping relationship between the frequency range and the length, and if a frequency band corresponding to a first frequency range is higher than a frequency band corresponding to a second frequency range, first length corresponding to the first frequency range is not greater than second length corresponding to the second frequency range.

In a possible design of the second aspect, the method further includes the following. The network device sends a first message to the terminal, where the first message is used to indicate the length.

In a possible design of the second aspect, the communication parameter is a guard period for downlink to uplink switching, and the method further includes the following. The network device sends a second message to the terminal, where the second message carries the guard period, and the guard period is used to implicitly indicate the length.

In a possible design of the second aspect, if a plurality of serving cells are configured for the terminal, each serving cell corresponds to a period of time, where length of the period of time is determined based on a communication parameter of a corresponding serving cell; or all serving cells correspond to a period of time, where the period of time is determined based on a maximum value of a plurality of pieces of length determined based on communication parameters of all the serving cells; or each serving cell group corresponds to a period of time, where the period of time is determined based on a maximum value of a plurality of pieces of length determined based on communication parameters of all serving cells in the group; and the serving cell group is determined based on a frequency range in which each serving cell is located or a timing advance group in which each serving cell is located.

According to a third aspect, an embodiment of this application provides a terminal, including: a transceiver module, configured to perform measurement in a measurement gap; and a processing module, configured to determine whether to conduct uplink sending in a period of time, where the period of time starts from the end of the measurement gap, and length of the period of time is determined by the terminal based on a communication parameter.

In a possible design of the third aspect, the communication parameter is a timing advance of the terminal, and there is a mapping relationship between the timing advance and the length, where if a first timing advance is less than a second timing advance, first length corresponding to the first timing advance is not greater than second length corresponding to the second timing advance.

In a possible design of the third aspect, the length is a step function of the timing advance, and if $TA \in [0, a-x)$, $TL=a$; or if $TA \in [a-x, b-x]$, $TL=b$, where TA is the timing advance, TL is the length, $a=Ns$, $b=a+Ms$, N and M are positive integers, s is half a slot length, one slot length, or one symbol length, X is a margin, and a length of X is a length of a cyclic prefix CP.

In a possible design of the third aspect, the communication parameter is parameter information of a serving cell of the terminal, and the parameter information of the serving cell includes one or a combination of the following: a subcarrier spacing or a frequency range.

In a possible design of the third aspect, there is a mapping relationship between the subcarrier spacing and the length, and if a first subcarrier spacing is greater than a second subcarrier spacing, first length corresponding to the first subcarrier spacing is not greater than second length corresponding to the second subcarrier spacing.

There is a mapping relationship between the frequency range and the length, and if a frequency band corresponding to a first frequency range is higher than a frequency band corresponding to a second frequency range, first length corresponding to the first frequency range is not greater than second length corresponding to the second frequency range.

In a possible design of the third aspect, the communication parameter is a first message, and the transceiver module is further configured to receive the first message sent by the network device, where the first message is used to indicate the length.

In a possible design of the third aspect, the communication parameter is a guard period for downlink to uplink switching, and the transceiver module is further configured to receive a second message sent by the network device, where the second message carries the guard period, and the length is determined by the terminal based on the guard period.

In a possible design of the third aspect, if a plurality of serving cells are configured for the terminal, each serving cell corresponds to a period of time, where length of the period of time is determined based on a communication parameter of a corresponding serving cell; or all serving cells correspond to a period of time, where the period of time is determined based on a maximum value of a plurality of pieces of length determined based on communication parameters of all the serving cells; or each serving cell group corresponds to a period of time, where the period of time is determined based on a maximum value of a plurality of pieces of length determined based on communication parameters of all serving cells in the group; and the serving cell group is determined based on a frequency range in which each serving cell is located or a timing advance group in which each serving cell is located.

According to a fourth aspect, an embodiment of this application provides a network device, including: a processing module, configured to generate scheduling information, where the scheduling information is used to schedule a terminal to conduct uplink transmission after a period of time ends. The period of time starts from the end of a measurement gap, length of the period of time is determined by the network device based on a communication parameter, and the measurement gap is a time period in which the terminal performs measurement; and a transceiver module, configured to send the scheduling information to the terminal.

In a possible design of the fourth aspect, the communication parameter is a timing advance of the terminal, and there is a mapping relationship between the timing advance and the length, where if a first timing advance is less than a second timing advance, first length corresponding to the first timing advance is not greater than second length corresponding to the second timing advance.

In a possible design of the fourth aspect, the length is a step function of the timing advance, and if $TA \in [0, a-x)$, $TL=a$; or if $TA \in [a-x, b-x]$, $TL=b$, where TA is the timing advance, TL is the length, $a=Ns$, $b=a+Ms$, N and M are positive integers, s is half a slot length, one slot length, or one symbol length, X is a margin, and a length of X is a length of a cyclic prefix CP.

In a possible design of the fourth aspect, the communication parameter is parameter information of a serving cell of the terminal, and the parameter information of the serving cell includes one or a combination of the following: a subcarrier spacing or a frequency range.

In a possible design of the fourth aspect, there is a mapping relationship between the subcarrier spacing and the length, and if a first subcarrier spacing is greater than a second subcarrier spacing, first length corresponding to the first subcarrier spacing is not greater than second length corresponding to the second subcarrier spacing.

There is a mapping relationship between the frequency range and the length, and if a frequency band corresponding to a first frequency range is higher than a frequency band corresponding to a second frequency range, first length corresponding to the first frequency range is not greater than second length corresponding to the second frequency range.

In a possible design of the fourth aspect, the transceiver module is further configured to send a first message to the terminal, where the first message is used to indicate the length.

In a possible design of the fourth aspect, the communication parameter is a guard period for downlink to uplink switching, and the transceiver module is further configured to send a second message to the terminal, where the second message carries the guard period, and the guard period is used to implicitly indicate the length.

In a possible design of the fourth aspect, if a plurality of serving cells are configured for the terminal, each serving cell corresponds to a period of time, where length of the period of time is determined based on a communication parameter of a corresponding serving cell; or all serving cells correspond to a period of time, where the period of time is determined based on a maximum value of a plurality of pieces of length determined based on communication parameters of all the serving cells; or each serving cell group corresponds to a period of time, where the period of time is determined based on a maximum value of a plurality of pieces of length determined based on communication parameters of all serving cells in the group; and the serving cell group is determined based on a frequency range in which each serving cell is located or a timing advance group in which each serving cell is located.

According to a fifth aspect, an embodiment of this application provides a communication device, including a memory, a processor, and a computer program. The computer program is stored in the memory, and the processor runs the computer program to perform the method according to the first aspect or the possible designs of the first aspect.

According to a sixth aspect, an embodiment of this application provides a storage medium. The storage medium includes a computer program, and the computer program is used for implementing the method according to the first aspect or the possible designs of the first aspect.

According to a seventh aspect, an embodiment of this application provides a communication device, including a memory, a processor, and a computer program. The computer program is stored in the memory, and the processor runs the computer program to perform the method according to the second aspect or the possible designs of the second aspect.

According to an eighth aspect, an embodiment of this application provides a computer program product. The computer program product includes computer program code, and when the computer program code is run on a computer, the computer is enabled to perform the method according to the first aspect or the possible designs of the first aspect.

According to a ninth aspect, an embodiment of this application provides a chip, including a memory and a processor. The memory is configured to store a computer program, and the processor is configured to invoke the computer program from the memory and run the computer program, so that the processor performs the method according to the first aspect or the possible designs of the first aspect.

According to a tenth aspect, an embodiment of this application provides a storage medium. The storage medium includes a computer program, and the computer program is used for implementing the method according to the second aspect or the possible designs of the second aspect.

According to an eleventh aspect, an embodiment of this application provides a computer program product. The computer program product includes computer program code, and when the computer program code is run on a computer, the computer is enabled to perform the method according to the second aspect or the possible designs of the second aspect.

According to a twelfth aspect, an embodiment of this application provides a chip, including a memory and a processor. The memory is configured to store a computer program, and the processor is configured to invoke the computer program from the memory and run the computer program, so that the processor performs the method according to the second aspect or the possible designs of the second aspect.

According to the uplink transmission method and the device provided in the embodiments of this application, the terminal performs measurement in the measurement gap, and the terminal determines whether to conduct uplink sending in the period of time. The period of time starts from the end of the measurement gap, and the length of the period of time is determined based on the communication parameter, that is, the length of the period of time is not a fixed value. Therefore, uplink sending performed by the terminal after the measurement gap is standardized. When the terminal determines to conduct uplink sending in the period of time, measurement in the measurement gap is not affected. When the terminal determines not to conduct uplink sending in the period of time, the terminal conducts uplink sending after the period of time ends. On the one hand, the timing advance of the terminal does not affect measurement performed by the terminal in the measurement gap, and on the other hand, it is ensured that the terminal can conduct uplink sending in a timely manner, thereby improving resource utilization.

DETAILED DESCRIPTION OF ILLUSTRATIVE EMBODIMENTS

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that, with evolution of the network architecture and emergence of a new service scenario, the technical solutions provided in the embodiments of this application are also applicable to similar technical problems.

The embodiments of this application may be used in a wireless communication system. It should be noted that, the wireless communication system in the embodiments of this application includes but is not limited to a narrowband-internet of things (NB-IoT) system, a global system for mobile communications (GSM), an enhanced data rate for GSM evolution (EDGE) system, a wideband code division multiple access (WCDMA), a code division multiple access 2000 (CDMA2000) system, a time division-synchronous code division multiple access (TD-SCDMA) system, a long term evolution (LTE) system, and a new radio (NR) mobile communication system in 5th generation (5G) mobile communication.

Figure 1:
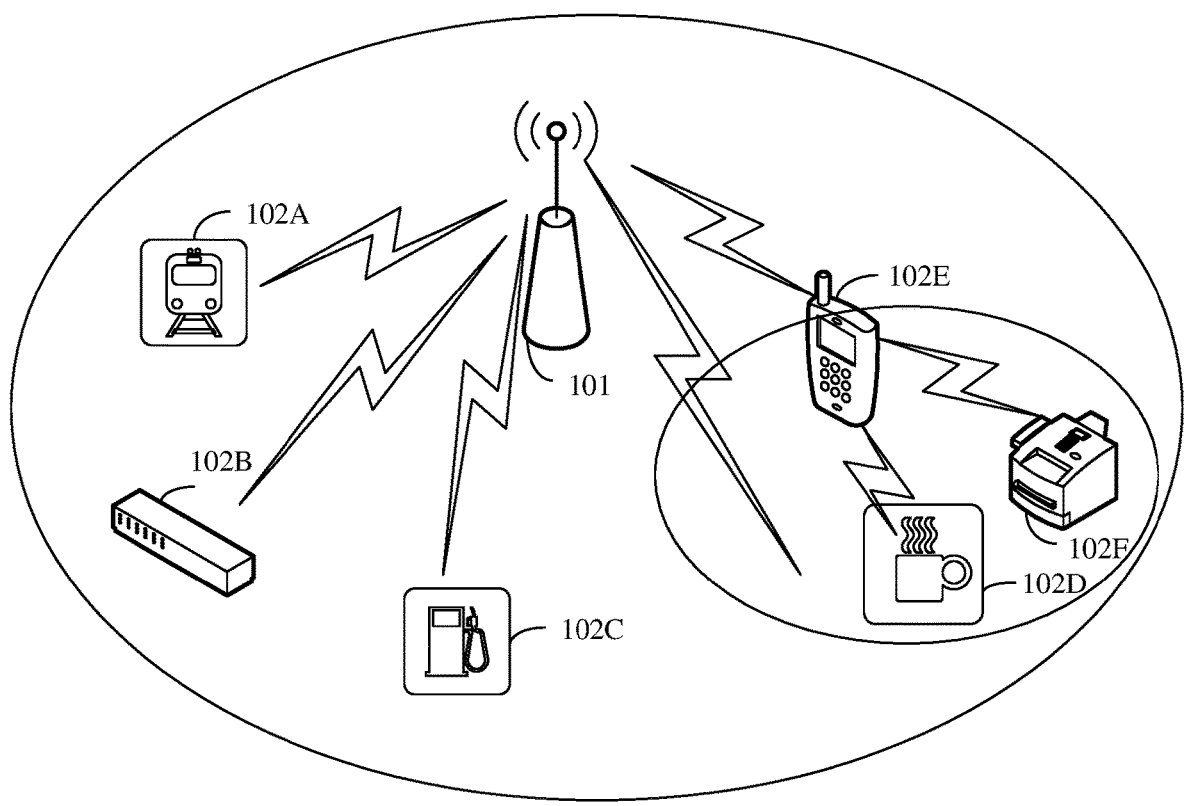
FIG. 1 shows a network architecture to which an embodiment of this application is applicable.

With reference to FIG. 1, the following describes a possible network architecture according to an embodiment of this application. FIG. 1 shows a network architecture to which an embodiment of this application is applicable. As shown in FIG. 1, the network architecture provided in this embodiment includes a network device 101 and a terminal 102.

The network device 101 is a device for accessing a terminal to a wireless network, and may be a base transceiver station (BTS) in a global system for mobile communications (GSM) or a code division multiple access (CDMA) system, a NodeB (NB) in a wideband code division multiple access (WCDMA) system, an evolved NodeB (eNB) in a long term evolution (LTE) system, a relay station or an access point, an NR-standard network side device (for example, a base station) in a future 5G network, a network device in a future evolved public land mobile network (PLMN), or the like. This is not limited herein. FIG. 1 is a possible schematic diagram that is drawn by using an example in which the network device 101 is a base station.

The terminal 102 may also be referred to as a terminal device. The terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, for example, a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent. This is not limited thereto.

FIG. 1 schematically shows a possible schematic diagram. The network device 101 and the terminals 102A to 102F form a communication system. In the communication system, the terminals 102A to 102F may send uplink data or a signal to the network device 101, and the network device 101 needs to receive the uplink data or the signal sent by the terminals 102A to 102F. The network device 101 may send downlink data or a signal to the terminals 102A to 102F, and the terminals 102A to 102F need to receive the downlink data or the signal sent by the network device 101. In addition, the terminals 102D to 102F may also form a communication system. In the communication system, the network device 101 may send downlink data to the terminal 102A, the terminal 102B, the terminal 102E, and the like. The terminal 102E may also send downlink data or a signal to the terminal 102D and the terminal 102F.

Figure 2:
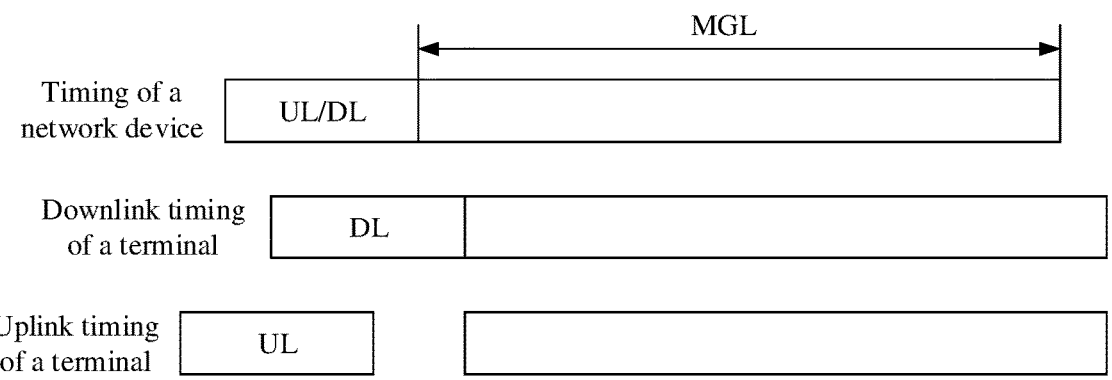
FIG. 2 is a schematic diagram of timing of a network device and a terminal according to an embodiment of this application.

In the communication system shown in FIG. 1, there is a propagation distance between the network device and the terminal, and the propagation distance causes a transmission delay between the network device and the terminal. FIG. 2 is a schematic diagram of timing of a network device and a terminal according to an embodiment of this application. As shown in FIG. 2, due to the transmission delay, during downlink (DL) transmission, downlink timing of the terminal is later than that of the network device. During uplink (UL) transmission, to ensure that signals sent by terminals at different distances from the network device can arrive at the network device at the same time, the terminal uses a timing advance (TA) for uplink sending. Therefore, uplink timing of the terminal is earlier than that of the network device. For example, in NR, the terminal may obtain a physical cell identifier of a cell, timing information, an SSB-based measurement result, and the like by detecting a synchronization signal block (SSB).

When a to-be-measured target frequency is not in an operating bandwidth of the terminal, the terminal measures the target frequency in a measurement gap. The measurement may be intra-frequency measurement or inter-frequency measurement, and a specific implementation of measurement performed by the terminal is not particularly limited in this embodiment. The terminal neither sends data nor receives data in the measurement gap. In NR, when determining a start point of the measurement gap, the terminal always refers to the downlink timing regardless of whether the terminal actually conducts uplink sending or downlink receiving before the measurement gap. When a plurality of serving cells are configured for the terminal, different serving cells may have different timings due to different distances from the network device. For a start point of a measurement gap, refer to downlink timing of a latest cell in all the serving cells. A measurement gap length (MGL) of the measurement gap is not particularly limited in this embodiment.

After the measurement gap ends, the terminal may immediately receive downlink data or a signal sent by the network device. However, considering that uplink timing of the terminal is advanced, to avoid interference to measurement caused by uplink sending in the measurement gap, and considering that an NR cell radius range is very large, from dozens of meters to hundreds of kilometers, currently, uplink sending is not conducted by setting a fixed time of 1 ms or one slot after the measurement gap, and the 1 ms or one slot may be insufficient or wasted. Therefore, the uplink sending behavior needs to be standardized. In this embodiment of this application, for uplink sending of the terminal, how long the terminal can conduct uplink sending after the measurement gap ends is specified, and an uplink resource that can be scheduled by the network device after the measurement gap ends is specified.

Figure 3:
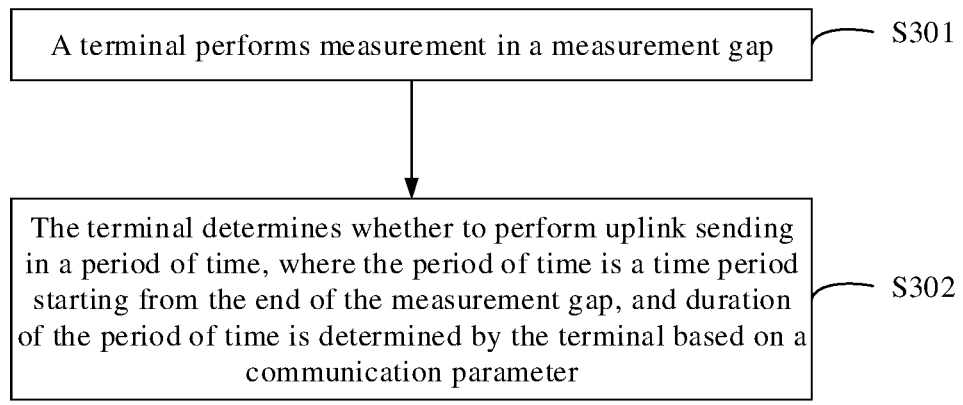
FIG. 3 is a signaling flowchart of uplink transmission according to an embodiment of this application.

FIG. 3 is a signaling flowchart of uplink transmission according to an embodiment of this application. As shown in FIG. 3, the method includes the following steps.

S301. A terminal performs measurement in a measurement gap.

S302. The terminal determines whether to conduct uplink sending in a period of time, where the period of time starts from the end of the measurement gap, and length of the period of time is determined by the terminal based on a communication parameter.

In this embodiment, the terminal performs measurement in the measurement gap, where the measurement may be intra-frequency measurement or inter-frequency measurement. The measurement performed by the terminal in the measurement gap is not particularly limited in this embodiment. In the measurement gap, the terminal sends or receives no data, but switches a receiver to a target frequency to measure the target frequency.

After the measurement gap ends, the terminal determines whether to conduct uplink sending in the period of time. In a possible implementation, the period of time starts from the end of the measurement gap, and the length of the period of time is determined based on the communication parameter.

Concepts related to time such as the measurement gap, the period of time, and the length in this embodiment are all defined for system time of a communication system. The system time refers to time that both the terminal and a network device comply with. The system time is the same as time of the network device.

The period of time may be a time period in a time unit of a subframe, a slot, a symbol, or the like. The symbol may be an orthogonal frequency division multiplexing (OFDM) symbol, or the period of time may be a time period in a time unit of milliseconds, microseconds, or the like. A unit of the period of time is not particularly limited in this embodiment.

In another possible implementation, when a slot partially overlapped with a last part of the measurement gap is caused because the measurement gap is advanced, the period of time is adjacent to the slot partially overlapped with the measurement gap, and is located after the slot. The period of time may be a time period in a time unit of a subframe, a slot, a symbol, or the like; or may be a time period in a time unit of milliseconds, microseconds, or the like. The length of the period of time is determined by the terminal based on the communication parameter, where the communication parameter may be a parameter used to represent a cell coverage area or an actual distance between the terminal and the network device.

The terminal may determine, according to implementation, whether to conduct uplink sending in the period of time. In a possible manner, if the terminal has two radio frequency transceivers, the terminal performs measurement in the measurement gap by using one radio frequency transceiver, and conducts uplink sending in the period of time by using the other transceiver. In another manner, the network device schedules, in the period of time, the terminal to conduct uplink sending. To avoid impact of uplink sending on measurement performed in the measurement gap, the terminal determines not to conduct uplink sending in the period of time. In still another manner, if the terminal completes measurement before the measurement gap ends, the terminal determines to conduct uplink sending in the period of time.

To be specific, in some scenarios, the terminal may conduct uplink sending in the period of time. In some scenarios, uplink sending performed by the terminal in the period of time affects measurement, that is, the terminal cannot conduct uplink sending. In this embodiment, a possible manner in which the terminal determines, according to implementation, whether to conduct uplink sending in the period of time is not described in detail herein in this embodiment.

A person skilled in the art may understand that, when the terminal determines to conduct uplink sending after the period of time ends, the network device can start to conduct uplink receiving after the end of the period of time. When conducting uplink sending, the terminal needs to consider uplink synchronization between the terminal and the network device, and the terminal conducts uplink sending based on the end of the period of time and a timing advance.

The uplink sending may be uplink sending of a physical uplink control channel (PUCCH), a physical uplink shared channel (PUSCH for short), a sounding reference signal (SRS), and the like. Specific uplink sending is not particularly limited in this embodiment.

Figure 4:
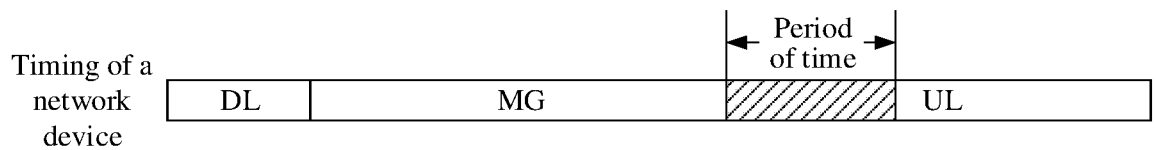
FIG. 4 is a schematic diagram of a period of time according to an embodiment of this application.

FIG. 4 is a schematic diagram of a period of time according to an embodiment of this application. As shown in FIG. 4, an example in which system time is consistent with timing of a network device is described in this embodiment. After a measurement gap (MG) ends, the period of time immediately follows. A person skilled in the art may understand that for uplink sending performed by a terminal after the measurement gap ends, the network device maintains an uplink receiving state after the measurement gap ends, and the period of time is a part of uplink receiving time. That is, in the period of time, if the terminal can conduct uplink sending, the network device may conduct uplink receiving; or if the terminal cannot conduct uplink sending, the network device starts to conduct uplink receiving after the period of time ends.

In this embodiment, length of the period of time is determined based on a communication parameter. In other words, the length of the period of time is not a fixed value, but is determined based on a communication parameter corresponding to a communication environment in which the terminal is located. The length of the period of time may be determined by considering cell coverage areas of different frequency ranges, or considering a cell coverage area actually deployed in a network, or considering an actual distance between the terminal and the network device. For example, a larger cell coverage area indicates longer length, or a larger actual distance indicates longer length. The communication parameter may be a parameter used to represent the cell coverage area, or may be a parameter used to represent the distance between the terminal and the network device.

In a possible design, the communication parameter may be a parameter of a serving cell of the terminal, for example, a subcarrier spacing or a frequency range. The communication parameter may further be a communication parameter of the terminal, for example, a timing advance of the terminal. Alternatively, the communication parameter may be a guard period of a system, or the like. The communication parameter is not particularly limited in this embodiment.

The terminal may determine the length of the period of time based on the communication parameter, or the network device may determine the length of the period of time, and then the network device indicates the length of the period of time to the terminal.

Because the length of the period of time is determined based on the communication parameter, the length of the period of time is not a determined value, and may be flexibly determined based on the communication parameter. When the terminal does not conduct uplink sending in the period of time according to implementation, a case in which the terminal conducts uplink sending in the measurement gap due to the timing advance of the terminal is avoided, and a resource waste caused by the terminal not conducting uplink sending for a long time after the measurement gap ends is avoided.

According to the uplink transmission method provided in the embodiments of this application, the terminal performs measurement in the measurement gap, and after the measurement gap ends, the terminal determines whether to conduct uplink sending in the period of time. The period of time starts from the end of the measurement gap, and the length of the period of time is determined based on the communication parameter, that is, the length of the period of time is not a fixed value. Therefore, uplink sending performed by the terminal after the measurement gap is standardized. When the terminal determines to conduct uplink sending in the period of time, measurement in the measurement gap is not affected. When the terminal determines not to conduct uplink sending in the period of time, the terminal conducts uplink sending after the period of time ends. On the one hand, the timing advance of the terminal does not affect measurement performed by the terminal in the measurement gap, and on the other hand, it is ensured that the terminal can conduct uplink sending in a timely manner, thereby improving resource utilization.

Based on the foregoing embodiment, the period of time may be determined by the terminal based on the communication parameter, or may be determined by the network device based on the communication parameter and then sent by the network device to the terminal. That the network device and/or the terminal determine/determines the period of time based on the communication parameter may include at least the following possible implementations.

In a possible implementation, the communication parameter is the timing advance of the terminal.

The timing advance may be a timing advance in an initial timing advance process or a timing advance in a timing advance update process. In a random access procedure, the network device determines an initial timing advance based on a random access preamble sent by the terminal, and sends, to the terminal, a random access response carrying the initial timing advance. However, as a distance between the terminal and the network device changes, the initial timing advance is no longer applicable, and the timing advance needs to be updated. When the timing advance of the terminal needs to be adjusted, the network device sends a timing advance command to the terminal, where the timing advance command includes adjustment information; and the terminal updates the timing advance based on the adjustment information. In a possible implementation, according to a requirement in 38.133, an advance of a first downlink detected path of uplink sending relative to a reference cell is $(N_{TA}+N_{TA\_offset}) \times T_c$. In the present invention, the timing advance may be $(N_{TA}+N_{TA\_offset}) \times T_c$, where $N_{TA}$ is a timing advance configured by a network side for the terminal, $N_{TA\_offset}$ is a fixed offset, and $T_c$ is a time unit.

For example, the length may be greater than or equal to the timing advance. For example, there is a mapping relationship between the timing advance and the length. If a first timing advance is less than a second timing advance, first length corresponding to the first timing advance is not greater than second length corresponding to the second timing advance.

For example, the timing advance and the length may be positively related, that is, a larger timing advance indicates longer length. An implementation of determining the timing advance by the terminal is not particularly limited in this embodiment.

In a possible design, the length is a step function of the timing advance, and if TA∈[0, a-x), TL=a; or if TA∈[a-x, b-x], TL=b, where TA is the timing advance, TL is the length, a=Ns, b=a+Ms, N and M are positive integers, s is half a slot length, one slot length, or one symbol length, and X is a margin. The margin may be set according to an empirical value, or may be determined according to another factor. The symbol may be, for example, an OFDM symbol. For example, a length of X is a length of a cyclic prefix CP. Optionally, when a slot partially overlapped with the measurement gap is caused due to a measurement gap timing advance (MGTA), s is half a slot length, and in other cases, s is one slot length.

The cyclic prefix (CP) may be a normal cyclic prefix, an extended cyclic prefix, or a cyclic prefix of another type. A type of the cyclic prefix is not particularly limited in this embodiment.

When X is used as the margin, a timing adjustment autonomously performed by the terminal is mainly considered. The margin may be a length of a CP, or may be another length. An implementation of the margin is not particularly limited in this embodiment.

In this embodiment, timing advances that belong to a same range correspond to same length. For example, TAs between a-x and b-x correspond to same length. For a timing advance at a boundary, for example, a-x or b-x, it may be determined that corresponding length when a-x or b-x is used as a right boundary is final length. For example, length corresponding to a-x is a instead of b, and length corresponding to b-x is b. Alternatively, it may be determined that corresponding length when a-x or b-x is used as a left boundary is final length. For example, length corresponding to a-x is b instead of a. A value of the boundary is not particularly limited in this embodiment, provided that a value of the length corresponding to the boundary is ensured to be unique.

For example, this embodiment provides a part of the step function, and the step function may further include more content. For example, if TA∈[b-x, c-x], TL=c; and if TA∈ [c-x, d-x], TL=d, . . . , and the rest may be deduced by analogy. In this case, a, b, c, and d may be in an ascending sequence. For example, a, b, c, and d are in an arithmetic progression, and a tolerance is an integer multiple of half a slot or a slot.

It can be learned from the foregoing that the length in this embodiment is an integer multiple of half a slot length, and the length is greater than the timing advance. A difference between the length and the timing advance is not less than the length of the cyclic prefix.

For example, when the terminal is relatively close to the network device, for example, a distance between the terminal and the network device is 500 meters, and an actual timing advance is 3.3 μs, using the foregoing fixed length of 1 ms causes an unnecessary resource waste. A plurality of pieces of length may be obtained by dividing the timing advance, and length corresponding to the timing advance may be determined based on a range to which the timing advance belongs, thereby avoiding a resource waste.

In this embodiment, the length of the period of time is determined based on the timing advance, and the length is greater than the timing advance. Therefore, when the terminal determines not to conduct uplink sending in the period of time, and conducts uplink sending after the period of time ends, a timing advance operation of the terminal does not affect measurement performed by the terminal in the measurement gap, and it is also ensured that the terminal can conduct uplink sending in a timely manner, thereby improving resource utilization.

In still another possible implementation, the communication parameter is parameter information of a serving cell of the terminal. For example, the parameter information of the serving cell includes one or a combination of the following: a subcarrier spacing or a frequency range.

There is a mapping relationship between the subcarrier spacing and the length. A wide range of frequency bands are used for 5G services and can be deployed in various modes. A subcarrier spacing of 5G NR is $15^n$ kHz, where n is an integer. For example, the subcarrier spacing is 15 kHz, 30 kHz, 60 kHz, 120 kHz, or 240 kHz. A large subcarrier spacing is designed to support a latency-sensitive service, a small coverage scenario, and a high-carrier scenario; and a small subcarrier spacing is designed to support a low-carrier scenario, a large coverage scenario, narrow-band equipment, and an enhanced broadcast/multicast service.

If a first subcarrier spacing is greater than a second subcarrier spacing, first length corresponding to the first subcarrier spacing is not greater than second length corresponding to the second subcarrier spacing.

In this embodiment, the subcarrier spacing and the length may be negatively related, that is, a larger subcarrier spacing indicates shorter length. The mapping relationship between the subcarrier spacing and the length may also be a step function. For example, the subcarrier spacing 15 kHz and the subcarrier spacing 30 kHz are mapped to length A, the subcarrier spacing 60 kHz and the subcarrier spacing 120 kHz are mapped to length B, and the subcarrier spacing 240 kHz is mapped to length C. Correspondingly, the length A>the length B>the length C.

Different cells may have different frequency ranges. The frequency range of the cell refers to a frequency range of frequency bands. There is a mapping relationship between the frequency range and the length, and if a frequency band corresponding to a first frequency range is higher than a frequency band corresponding to a second frequency range, first length corresponding to the first frequency range is not greater than second length corresponding to the second frequency range.

A cell with a high frequency band has a small coverage area, and a cell with a low frequency band has a large coverage area. Therefore, a frequency band corresponding to a frequency range (FR) and the length may be negatively related, that is, a higher frequency band indicates shorter length. Alternatively, similar to that of the subcarrier spacing, a frequency band corresponding to a frequency range may be in a step function relationship with the length, that is, length corresponding to two adjacent frequency bands is the same. A period of time applicable to the terminal is determined based on different frequency ranges. For example, the earliest uplink sending time of the terminal in an FR 1 is 2 ms away from the end of the measurement gap, and the earliest uplink sending time of the terminal in an FR 2 is 0.125 ms away from the end of the measurement gap.

In this embodiment, the length of the period of time is determined based on the subcarrier spacing or the frequency range, and a maximum cell radius that may be supported in a specific subcarrier spacing or frequency range is mainly considered. Therefore, when the terminal determines not to conduct uplink sending in the period of time, and conducts uplink sending after the period of time ends, the timing advance of the terminal does not affect measurement performed by the terminal in the measurement gap, and it is also ensured that the terminal can conduct uplink sending in a timely manner, thereby improving resource utilization.

In still another possible implementation, the communication parameter is a first message sent by the network device to the terminal, and the first message is used to indicate the length.

The first message may be configuration information, indication information, or other communication information between the terminal and the network device. An implementation of the first message is not particularly limited in this embodiment. An indication field is set in the first message, and the indication field is used to explicitly indicate the length.

The length is explicitly indicated to the terminal by the network device, so that the terminal can efficiently and directly obtain the length, thereby improving processing efficiency of the terminal.

In still another possible implementation, the length is determined based on a guard period. The guard period is a guard period (GP) from downlink transmission to uplink transmission, to reduce interference between uplink and downlink transmission. The guard period may be flexibly configured. In different scenarios, lengths of the guard period are different. An implementation of determining the guard period by the network device is not particularly limited in this embodiment.

The guard period is configured by the network device for the terminal, and the terminal may determine length of a period of time based on the guard period. For example, the length is length of the guard period.

A person skilled in the art may understand that, for the network device, the network device may implicitly indicate the length to the terminal. For example, the terminal determines the length by using the guard period. For the terminal, the guard period may be understood as the communication parameter, and the terminal determines the length of the period of time based on the guard period.

In this embodiment, the network device sends the guard period to the terminal device, to implicitly indicate the length of the period of time, thereby reducing signaling overheads between the network device and the terminal. The terminal uses the length of the guard period as the length of the period of time, and the terminal does not need to perform other processing, thereby reducing processing of the terminal and saving resources of the terminal.

In the foregoing embodiment, several possible implementations in which the terminal and/or the network device determine/determines the length of the period of time based on the communication parameter are provided. This embodiment of this application is not limited to the foregoing possible implementations, and further includes another possible implementation, for example, another implementation obtained by transforming the foregoing several possible implementations, or another implementation derived from one or more of the foregoing several possible implementations. An implementation of obtaining the length based on the communication parameter is not particularly limited in this embodiment, provided that the network device and the terminal have a same understanding when determining the length.

Figure 5:
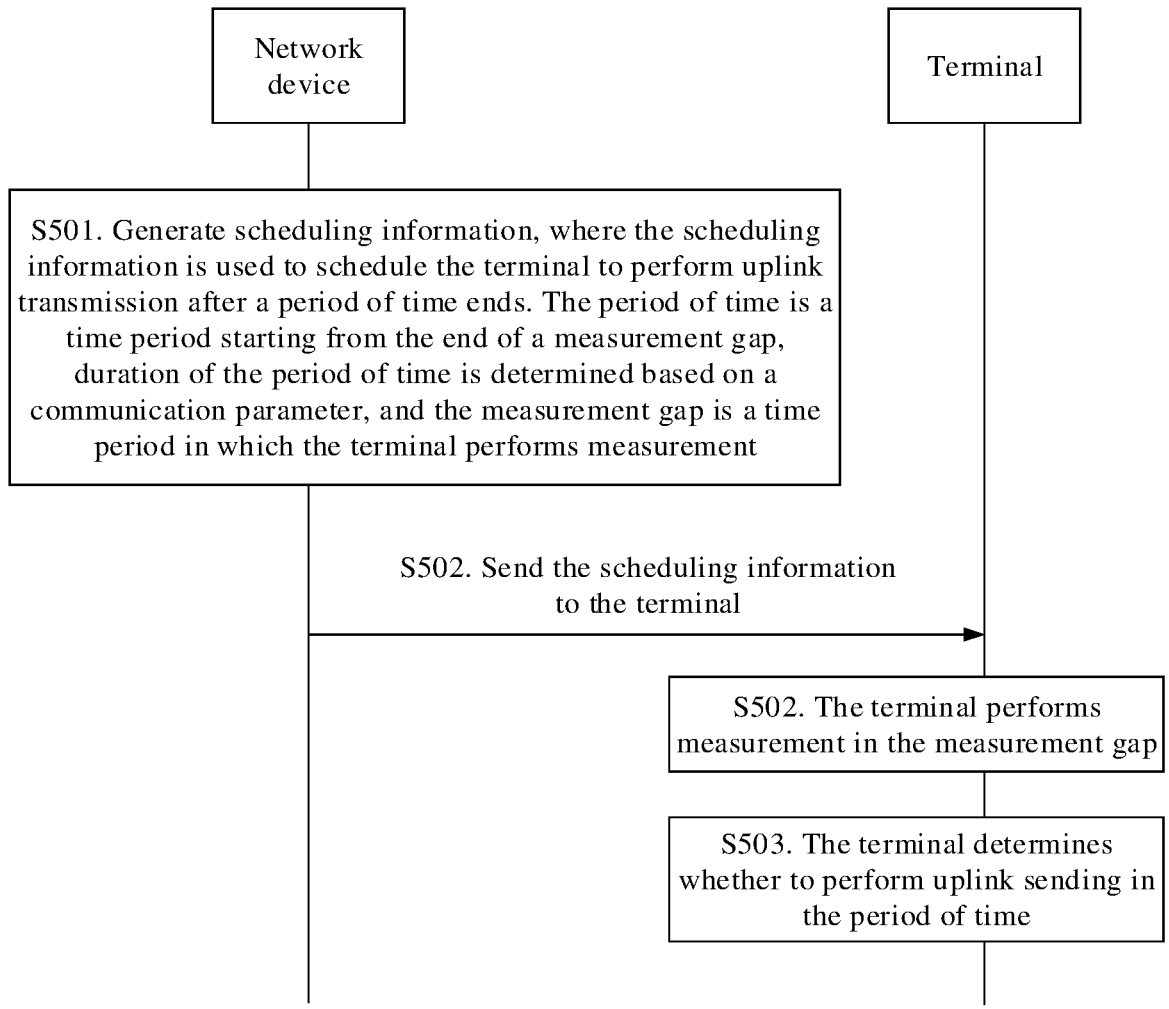
FIG. 5 is a signaling flowchart of uplink transmission according to an embodiment of this application.
Figure 6:
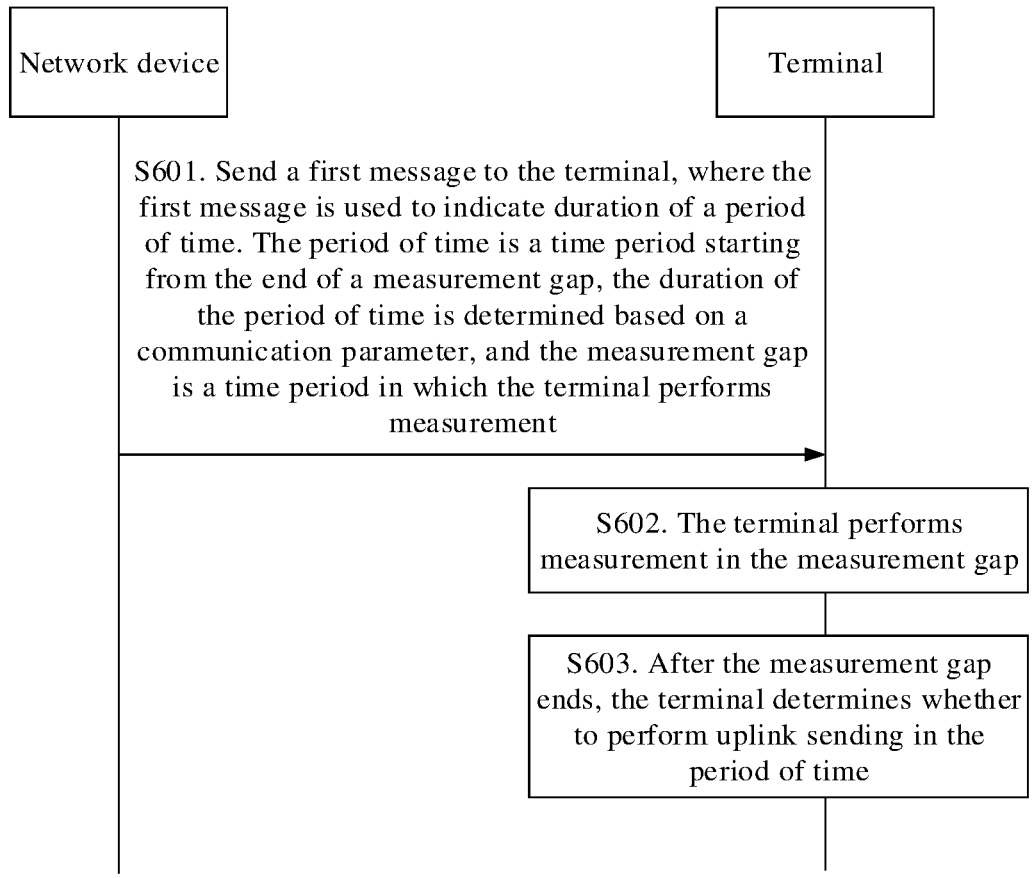
FIG. 6 is a signaling flowchart of uplink transmission according to an embodiment of this application.

Based on the foregoing embodiment, the following provides a detailed description with reference to FIG. 5 and FIG. 6 for a case in which the network device determines the length of the period of time and schedules and configures the terminal based on the length of the period of time. For same or similar steps or technical terms, refer to the foregoing embodiments. Details are not described again in the following embodiments.

FIG. 5 is a signaling flowchart of uplink transmission according to an embodiment of this application. As shown in FIG. 5, the procedure includes the following steps.

S501. A network device generates scheduling information, where the scheduling information is used to schedule a terminal to conduct uplink transmission after a period of time ends. The period of time starts from the end of a measurement gap, length of the period of time is determined based on a communication parameter, and the measurement gap is a time period in which the terminal performs measurement.

S502. The network device sends the scheduling information to the terminal.

S503. The terminal performs measurement in the measurement gap.

S504. The terminal determines whether to conduct uplink sending in the period of time.

In this embodiment, the network device sends the scheduling information to the terminal. The scheduling information is used to avoid scheduling the terminal to conduct uplink transmission in the period of time. For example, when the terminal performs uplink transmission, the scheduling information may include information about an uplink resource used by the terminal for uplink sending. The scheduling information is determined based on the length of the period of time, and the scheduling information is used to avoid scheduling an uplink resource in the period of time. To be specific, the uplink resource does not include a resource in the period of time. The network device may schedule the terminal to conduct uplink sending on a resource obtained after the period of time ends, where the resource is a resource used for uplink sending after the period of time ends. The length of the period of time is determined based on the communication parameter. For details, refer to the foregoing embodiment. Details are not described herein again in this embodiment. A person skilled in the art may understand that when the terminal does not transmit uplink data, the network device may not schedule uplink transmission of the terminal.

After receiving the scheduling information, the terminal performs measurement in the measurement gap. For a specific implementation process, refer to the embodiment shown in FIG. 3. Details are not described herein again in this embodiment.

According to the uplink transmission method provided in this embodiment, the network device sends the scheduling information to the terminal device, to avoid scheduling the terminal to conduct uplink transmission in the period of time. The length of the period of time is determined based on the communication parameter, that is, the length of the period of time is not a fixed value, so that a resource that can be scheduled by the network device is determined. When the terminal conducts uplink sending based on scheduling of the network device after the period of time ends, measurement in the measurement gap is not affected, and it is also ensured that the terminal can conduct uplink sending in a timely manner, thereby improving resource utilization.

FIG. 6 is a signaling flowchart of uplink transmission according to an embodiment of this application. As shown in FIG. 6, the procedure includes the following steps.

S601. A network device sends a first message to a terminal, where the first message is used to indicate length of a period of time. The period of time starts from the end of a measurement gap, the length of the period of time is determined based on a communication parameter, and the measurement gap is a time period in which the terminal performs measurement.

S602. The terminal performs measurement in the measurement gap.

S603. After the measurement gap ends, the terminal determines whether to conduct uplink sending in the period of time.

In this embodiment, the network device may explicitly indicate the length of the period of time to the terminal by using the first message. For example, the first message may be higher layer signaling. The higher layer signaling is, for example, system information, a radio resource control message, or downlink control information. An indication field may be added to the higher layer signaling, and the indication field is used to indicate the length of the period of time. For another example, the first message may alternatively be independent configuration information, that is, newly added indication signaling. There is an indication field in the indication signaling for indicating the length of the period of time.

The indication field in the first message may directly indicate the length. Alternatively, there is a correspondence between an indication value of the indication field in the first message and the length, and the terminal determines the length based on the correspondence and the indication value. An implementation of indicating the length by using the first message is not particularly limited in this embodiment.

According to the uplink transmission method provided in this embodiment, the network device sends the first message to the terminal to indicate the length of the period of time, and the length can be explicitly indicated, so that the terminal can quickly and conveniently obtain the length. The length is determined based on the communication parameter, that is, the length of the period of time is not a fixed value. When the terminal conducts uplink sending based on scheduling of the network device after the period of time ends, measurement in the measurement gap is not affected, and it is also ensured that the terminal can conduct uplink sending in a timely manner, thereby improving resource utilization.

Figure 7:
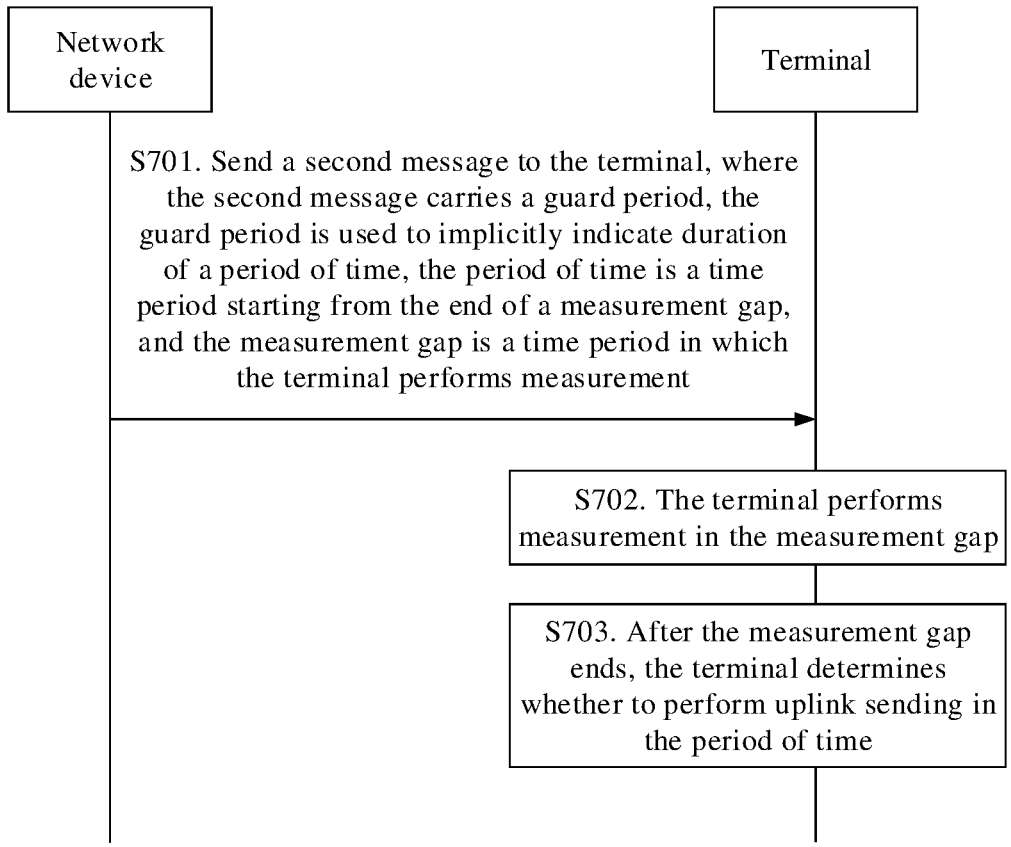
FIG. 7 is a signaling flowchart of uplink transmission according to an embodiment of this application.

FIG. 7 is a signaling flowchart of uplink transmission according to an embodiment of this application. As shown in FIG. 7, the procedure includes the following steps.

S701. A network device sends a second message to a terminal, where the second message carries a guard period, the guard period is used to implicitly indicate length of a period of time, the period of time starts from the end of a measurement gap, and the measurement gap is a time period in which the terminal performs measurement.

S702. The terminal performs measurement in the measurement gap.

S703. After the measurement gap ends, the terminal determines whether to conduct uplink sending in the period of time.

After the network device determines the guard period, the network device generates the second message, where the second message carries the guard period. A value of the guard period is not a fixed value, and the guard period may have a plurality of values. An implementation of determining the guard period by the network device is not particularly limited in this embodiment. The guard period may implicitly indicate the length.

The second message may be a system message, and the system message carries the guard period. Alternatively, the second message may be a configuration message, and the configuration message carries the guard period. An implementation of the second message is not particularly limited in this embodiment.

After receiving the second message, the terminal determines the length based on the guard period in the second message. Specifically, the terminal determines length of the guard period as the length of the period of time.

According to the uplink transmission method provided in this embodiment, the network device implicitly indicates the length of the period of time by using the guard period carried in the second message, so that signaling overheads between the network device and the terminal device are not increased. The length is determined based on the communication parameter, that is, the length of the period of time is not a fixed value. When the terminal conducts uplink sending based on scheduling of the network device after the period of time ends, measurement in the measurement gap is not affected, and it is also ensured that the terminal can conduct uplink sending in a timely manner, thereby improving resource utilization.

Based on the foregoing embodiment, the terminal may determine the length of the period of time in one of the implementations in the embodiments shown in FIG. 5 to FIG. 7.

Alternatively, the terminal obtains scheduling information based on the implementation shown in FIG. 5, and the terminal may further obtain the length of the period of time based on the implementation shown in FIG. 6 or FIG. 7.

Based on the foregoing embodiment, if a plurality of serving cells are configured for the terminal, the terminal may conduct uplink sending in each serving cell. That the terminal and the network device determine the length of the period of time includes the following possible implementations.

In a possible implementation, each serving cell corresponds to a period of time, where length of the period of time is determined based on a communication parameter of a corresponding serving cell.

For example, the length of the period of time of each serving cell is obtained based on the foregoing implementation, and a one-to-one correspondence between the serving cell and the length of the period of time is established, that is, each serving cell corresponds to one piece of length.

In another possible implementation, all serving cells correspond to a period of time, where the period of time is determined based on a maximum value of a plurality of pieces of length determined based on communication parameters of all the serving cells.

For example, the length of the period of time of each serving cell is obtained based on the foregoing implementation, then the longest length is determined from all pieces of length as final length, and a correspondence between all serving cells and the longest length is established.

In still another possible implementation, each serving cell group corresponds to a period of time, where the period of time is determined based on a maximum value of a plurality of pieces of length determined based on communication parameters of all serving cells in the group; and the serving cell group is determined based on a frequency range in which each serving cell is located or a timing advance group in which each serving cell is located.

All the serving cells are grouped into a plurality of groups. In a grouping process, grouping may be performed based on a frequency range. To be specific, the serving cells in a same frequency range are in a group. Alternatively, grouping may be further performed based on a timing advance group of the serving cells. To be specific, the serving cells in a same timing advance group are in a group.

Each serving cell group corresponds to one period of time, that is, the serving cell group is in a one-to-one correspondence with the period of time. For the period of time of each cell group, the period of time is determined based on the maximum value of the plurality of pieces of length determined based on the communication parameters of all the serving cells in the group. That is, each serving cell in the serving cell group corresponds to one piece of length, and the longest length is used as the length of the serving cell group.

In this embodiment, when the plurality of uplink serving cells are configured for the terminal, the terminal determines an implementation of the length of the period of time, so that in a scenario in which the plurality of serving cells are configured for the terminal, uplink sending performed by the terminal after the measurement gap does not affect measurement performed in the measurement gap, and it can also be ensured that the terminal can conduct uplink sending in a timely manner, thereby improving resource utilization.

This application further provides an embodiment. In this embodiment, that a network device configures a slot format indicator for a terminal is described.

In NR, a basic scheduling unit in time domain is a slot or a mini-slot, which is collectively referred to as a slot herein for brevity. A slot includes several OFDM symbols. NR supports flexible slot formats. To be specific, symbols in one slot may be all used to transmit uplink data, all used to transmit downlink data, partially used to transmit uplink data, or partially used to transmit downlink data. The slot format may also be understood as a slot format, or slot format related information. The slot format may be indicated by using control information carried on a common physical downlink control channel.

The downlink control information includes a slot format indicator (SFI), and the slot format indicator is used to indicate which symbols in a slot are uplink symbols, which symbols are downlink symbols, or which symbols are guard periods.

In a possible implementation, when configuring a slot format indicator (SFI) for the terminal, the network device should ensure that:

If there is no symbol for downlink transmission in a slot after a measurement gap, a large enough guard period should be reserved between the end of the measurement gap and the first symbol for uplink transmission, to ensure that uplink transmission is not affected.

If there is a symbol for downlink transmission in a slot after a measurement gap, a large enough guard period should be reserved between the last downlink symbol and the first symbol for uplink transmission, to ensure that uplink transmission is not affected.

For example, assuming that a length of a sum of an actual TA of the terminal and uplink-downlink switching time is two symbols, when configuring the SFI for the terminal, the network device should ensure that at least two symbols before the first uplink symbol after the guard period are not used for receiving or sending, but are used as the guard period, to ensure that uplink transmission is not affected.

Figure 8:
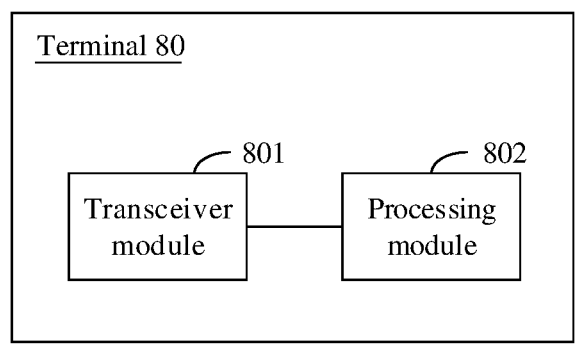
FIG. 8 is a schematic structural diagram of a terminal according to an embodiment of this application.

FIG. 8 is a schematic structural diagram of a terminal according to an embodiment of this application. As shown in FIG. 8, the terminal 80 includes: a transceiver module 801, configured to perform measurement in a measurement gap; and a processing module 802, configured to determine whether to conduct uplink sending in a period of time, where the period of time starts from the end of the measurement gap, and length of the period of time is determined by the terminal based on a communication parameter.

In a possible design, the communication parameter is a timing advance of the terminal, and there is a mapping relationship between the timing advance and the length, where if a first timing advance is less than a second timing advance, first length corresponding to the first timing advance is not greater than second length corresponding to the second timing advance.

In a possible design, the length is a step function of the timing advance, and if TA∈[0, a-x), TL=a; or if TA∈[a-x, b-x], TL=b, where TA is the timing advance, TL is the length, a=Ns, b=a+Ms, N and M are positive integers, s is half a slot length, one slot length, or one symbol length, X is a margin, and a length of X is a length of a cyclic prefix CP.

In a possible design, the communication parameter is parameter information of a serving cell of the terminal, and the parameter information of the serving cell includes one or a combination of the following: a subcarrier spacing or a frequency range.

In a possible design, there is a mapping relationship between the subcarrier spacing and the length, and if a first subcarrier spacing is greater than a second subcarrier spacing, first length corresponding to the first subcarrier spacing is not greater than second length corresponding to the second subcarrier spacing.

There is a mapping relationship between the frequency range and the length, and if a frequency band corresponding to a first frequency range is higher than a frequency band corresponding to a second frequency range, first length corresponding to the first frequency range is not greater than second length corresponding to the second frequency range.

In a possible design, the communication parameter is a first message, and the transceiver module 801 is further configured to receive the first message sent by the network device, where the first message is used to indicate the length.

In a possible design, the communication parameter is a guard period for downlink to uplink switching, and the transceiver module 801 is further configured to receive a second message sent by the network device, where the second message carries the guard period, and the length is determined by the terminal based on the guard period.

In a possible design, if a plurality of serving cells are configured for the terminal, each serving cell corresponds to a period of time, where length of the period of time is determined based on a communication parameter of a corresponding serving cell; or all serving cells correspond to a period of time, where the period of time is determined based on a maximum value of a plurality of pieces of length determined based on communication parameters of all the serving cells; or each serving cell group corresponds to a period of time, where the period of time is determined based on a maximum value of a plurality of pieces of length determined based on communication parameters of all serving cells in the group; and the serving cell group is determined based on a frequency range in which each serving cell is located or a timing advance group in which each serving cell is located.

The terminal provided in this embodiment of this application may be configured to perform the methods shown in FIG. 3 to FIG. 7. An implementation principle and a technical effect of the terminal are similar to those of the methods shown in FIG. 3 to FIG. 7. Details are not described in this embodiment again.

It should be understood that the processing module 802 in this embodiment of this application may be implemented by a processor or a processor-related circuit component, and the transceiver module 801 may be implemented by a transceiver or a transceiver-related circuit component.

Figure 9:
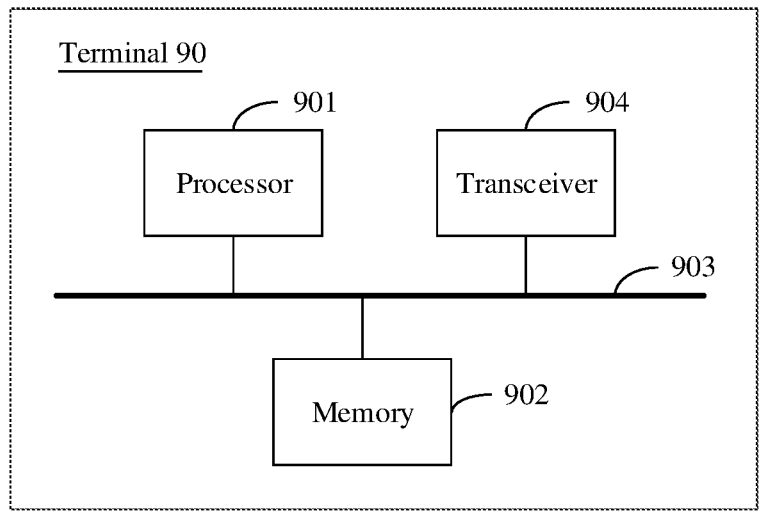
FIG. 9 is a schematic diagram of hardware of a terminal according to an embodiment of this application.

FIG. 9 is a schematic diagram of hardware of a terminal according to an embodiment of this application. As shown in FIG. 9, the terminal 90 includes a processor 901 and a memory 902.

The memory 902 is configured to store a computer program.

The processor 901 is configured to execute the computer program stored in the memory, to implement the methods performed by the terminal in FIG. 3 to FIG. 7. For details, refer to the related descriptions in the foregoing method embodiments.

Optionally, the memory 902 may be independent, or may be integrated with the processor 901.

When the memory 902 is a device independent of the processor 901, the terminal 90 may further include: a bus 903, configured to connect the memory 902 and the processor 901. The terminal 90 may further include a transceiver 904, configured to perform measurement in a measurement gap.

An embodiment of this application provides a storage medium. The storage medium includes a computer program, and the computer program is used to implement the methods performed by the terminal in FIG. 3 to FIG. 7.

An embodiment of this application provides a computer program product. The computer program product includes computer program code, and when the computer program code is run on a computer, the computer is enabled to perform the methods performed by the terminal in FIG. 3 to FIG. 7.

Figure 10:
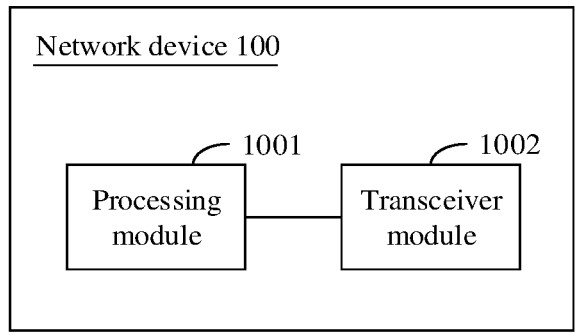
FIG. 10 is a schematic structural diagram of a network device according to an embodiment of this application.

FIG. 10 is a schematic structural diagram of a network device according to an embodiment of this application. As shown in FIG. 10, the network device 100 includes: a processing module 1001, configured to generate scheduling information, where the scheduling information is used to schedule a terminal to conduct uplink transmission after a period of time ends. The period of time starts from the end of a measurement gap, length of the period of time is determined by the network device based on a communication parameter, and the measurement gap is a time period in which the terminal performs measurement; and a transceiver module 1002, configured to send the scheduling information to the terminal.

In a possible design, the communication parameter is a timing advance of the terminal, and there is a mapping relationship between the timing advance and the length, where if a first timing advance is less than a second timing advance, first length corresponding to the first timing advance is not greater than second length corresponding to the second timing advance.

In a possible design, the length is a step function of the timing advance, and if TA∈[0, a-x), TL=a; or if TA∈[a-x, b-x], TL=b, where TA is the timing advance, TL is the length, a=Ns, b=a+Ms, N and M are positive integers, s is half a slot length, one slot length, or one symbol length, X is a margin, and a length of X is a length of a cyclic prefix CP.

In a possible design, the communication parameter is parameter information of a serving cell of the terminal, and the parameter information of the serving cell includes one or a combination of the following: a subcarrier spacing or a frequency range.

In a possible design, there is a mapping relationship between the subcarrier spacing and the length, and if a first subcarrier spacing is greater than a second subcarrier spacing, first length corresponding to the first subcarrier spacing is not greater than second length corresponding to the second subcarrier spacing.

There is a mapping relationship between the frequency range and the length, and if a frequency band corresponding to a first frequency range is higher than a frequency band corresponding to a second frequency range, first length corresponding to the first frequency range is not greater than second length corresponding to the second frequency range.

In a possible design, the transceiver module 1002 is further configured to send a first message to the terminal, where the first message is used to indicate the length.

In a possible design, the communication parameter is a guard period for downlink to uplink switching, and the transceiver module 1002 is further configured to send a second message to the terminal, where the second message carries the guard period, and the guard period is used to implicitly indicate the length.

In a possible design, if a plurality of serving cells are configured for the terminal, each serving cell corresponds to a period of time, where length of the period of time is determined based on a communication parameter of a corresponding serving cell; or all serving cells correspond to a period of time, where the period of time is determined based on a maximum value of a plurality of pieces of length determined based on communication parameters of all the serving cells; or each serving cell group corresponds to a period of time, where the period of time is determined based on a maximum value of a plurality of pieces of length determined based on communication parameters of all serving cells in the group; and the serving cell group is determined based on a frequency range in which each serving cell is located or a timing advance group in which each serving cell is located.

It should be understood that the processing module 1001 in this embodiment of this application may be implemented by a processor or a processor-related circuit component, and the transceiver module 1002 may be implemented by a transceiver or a transceiver-related circuit component.

Figure 11:
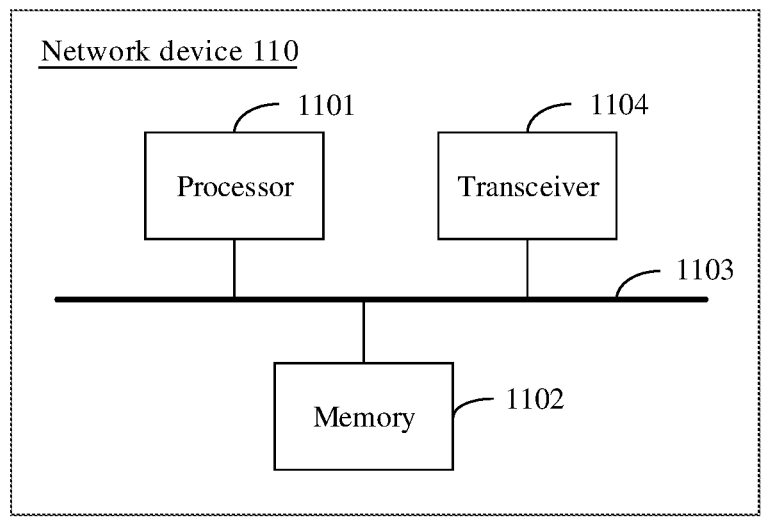
FIG. 11 is a schematic diagram of hardware of a network device according to an embodiment of this application.

FIG. 11 is a schematic diagram of hardware of a network device according to an embodiment of this application. As shown in FIG. 11, the network device 110 includes a processor 1101 and a memory 1102.

The memory 1102 is configured to store a computer program.

The processor 1101 is configured to execute the computer program stored in the memory, to implement the methods performed by the network device in FIG. 3 to FIG. 7. For details, refer to the related descriptions in the foregoing method embodiments.

Optionally, the memory 1102 may be independent, or may be integrated with the processor 1101.

When the memory 1102 is a device independent of the processor 1101, the network device 110 may further include: a bus 1103, configured to connect the memory 1102 and the processor 1101. The network device 110 may further include a transceiver 1104, configured to send scheduling information.

An embodiment of this application provides a storage medium. The storage medium includes a computer program, and the computer program is used to implement the methods performed by the network device in FIG. 3 to FIG. 7.

An embodiment of this application further provides a communication apparatus, and the communication apparatus may be a terminal or a circuit. The communication apparatus may be configured to perform an action performed by the terminal in the foregoing method embodiment.

Figure 12:
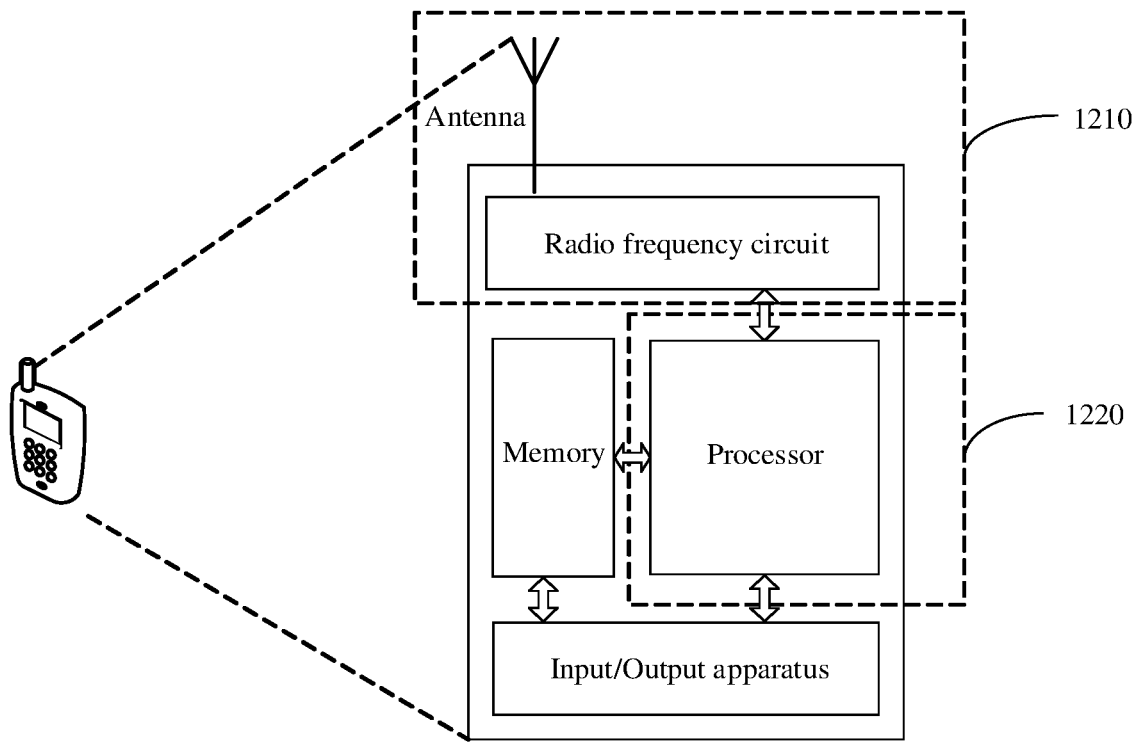
FIG. 12 is a schematic diagram of a communication apparatus according to an embodiment of this application.

When the communication apparatus is a terminal, FIG. 12 is a schematic structural diagram of a simplified terminal. For ease of understanding and illustration, in FIG. 12, a mobile phone is used as an example of the terminal. As shown in FIG. 12, the terminal includes a processor, a memory, a radio frequency circuit, an antenna, and an input/output apparatus. The processor is mainly configured to: process a communication protocol and communication data, and control the terminal to execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display, or a keyboard, is mainly configured to: receive data input by a user, and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 12 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, the antenna and the radio frequency circuit that have receiving and sending functions may be considered as a transceiver unit of the terminal device, and the processor that has a processing function may be considered as a processing unit of the terminal device. As shown in FIG. 12, the terminal device includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 1210 may be considered as a receiving unit, and a component for implementing a sending function in the transceiver unit 1210 may be considered as a sending unit. That is, the transceiver unit 1210 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1210 is configured to perform the sending operation and the receiving operation on the terminal device side in the foregoing method embodiments, and the processing unit 1220 is configured to perform an operation other than the sending operation and the receiving operation of the terminal device in the foregoing method embodiments.

For example, in an implementation, the transceiver unit 1210 is configured to perform the receiving operation on the terminal side in S301 in FIG. 3, that is, receive, in a measurement gap, a signal sent by a network device, to perform measurement; and/or the transceiver unit 1210 is further configured to perform another transceiver step on the terminal side in this embodiment of this application. The processing unit 1220 is configured to perform S302 in FIG. 3, and/or the processing unit 1220 is further configured to perform another processing step on the terminal device side in this embodiment of this application.

For another example, in another implementation, the transceiver unit 1210 is configured to perform the step of receiving scheduling information in FIG. 5, and/or the transceiver unit 1220 is further configured to perform another transceiver step on the terminal side in this embodiment of this application. The processing unit 1220 is configured to perform S503 in FIG. 5, and/or the processing unit 1220 is further configured to perform another processing step on the terminal side in this embodiment of this application.

For still another example, in still another implementation, the transceiver unit 1210 is configured to perform the step of receiving a first message in FIG. 6, and/or the transceiver unit 1210 is further configured to perform another transceiver step on the terminal side in this embodiment of this application. The processing unit 1220 is configured to perform S603 in FIG. 6, and/or the processing unit 1220 is further configured to perform another processing step on the terminal device side in this embodiment of this application.

For still another example, in still another implementation, the transceiver unit 1210 is configured to perform the step of receiving a second message in FIG. 7, and/or the transceiver unit 1210 is further configured to perform another transceiver step on the terminal device side in this embodiment of this application. The processing unit 1220 is configured to perform S703 in FIG. 7, and/or the processing unit 1220 is further configured to perform another processing step on the terminal device side in this embodiment of this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 13:
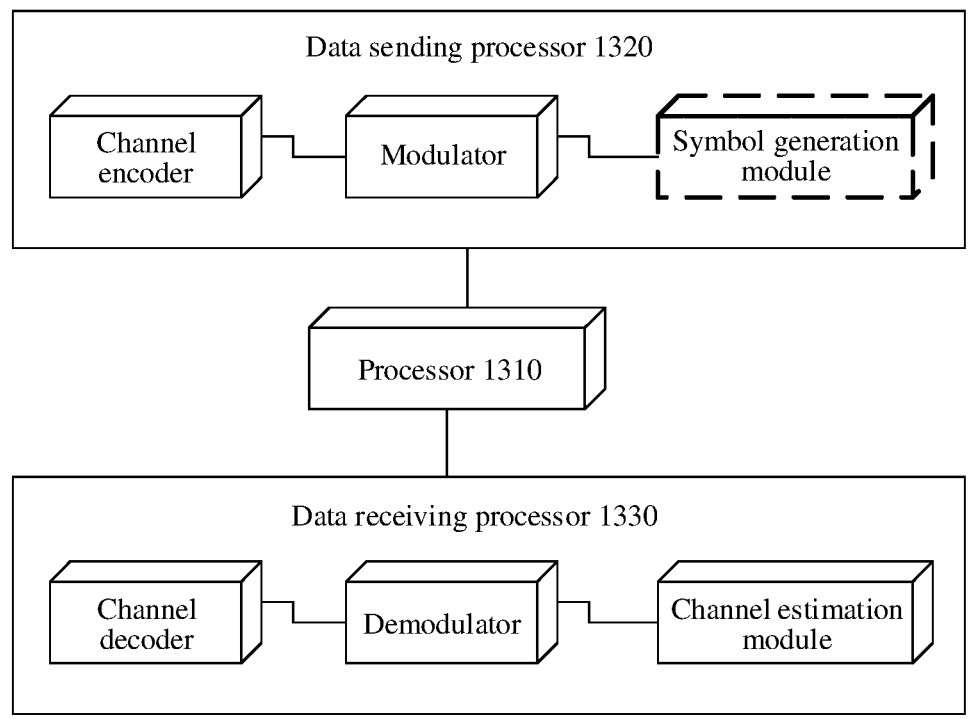
FIG. 13 is another schematic diagram of a communication apparatus according to an embodiment of this application.

When the communication apparatus in this embodiment is a terminal, refer to a device shown in FIG. 13. As an example, the device may implement a function similar to that of the processor 901 in FIG. 9. In FIG. 13, the device includes a processor 1310, a data sending processor 1320, and a data receiving processor 1330. The processing module 802 in the foregoing embodiment may be the processor 1310 in FIG. 13, and implements a corresponding function. The transceiver module 801 in the foregoing embodiment may be the data sending processor 1320 and/or the data receiving processor 1330 in FIG. 13. Although FIG. 13 shows a channel encoder and a channel decoder, it may be understood that these modules are merely examples, and do not constitute a limitation on this embodiment.

Figure 14:
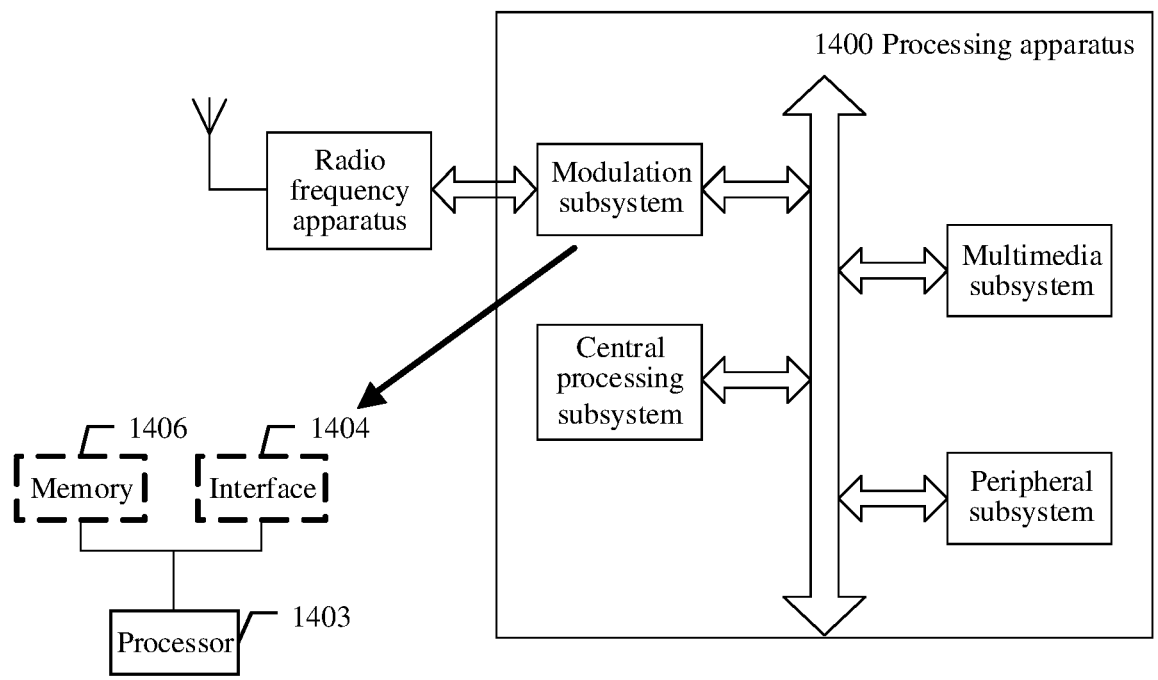
FIG. 14 is still another schematic diagram of a communication apparatus according to an embodiment of this application.

FIG. 14 shows another form of this embodiment. A processing apparatus 1400 includes modules such as a modulation subsystem, a central processing subsystem, and a peripheral subsystem. The communication apparatus in this embodiment may be used as the modulation subsystem in the processing apparatus. Specifically, the modulation subsystem may include a processor 1403 and an interface 1404. The processor 1403 implements a function of the processing module 802, and the interface 1404 implements a function of the transceiver module 801. In another variation, the modulation subsystem includes a memory 1406, a processor 1403, and a program that is stored in the memory 1406 and that can be run on the processor. When executing the program, the processor 1403 implements the method on the terminal device side in the foregoing method embodiments. It should be noted that the memory 1406 may be nonvolatile or volatile. The memory 1406 may be located in the modulation subsystem, or may be located in the processing apparatus 1400, provided that the memory 1406 can be connected to the processor 1403.

Figure 15:
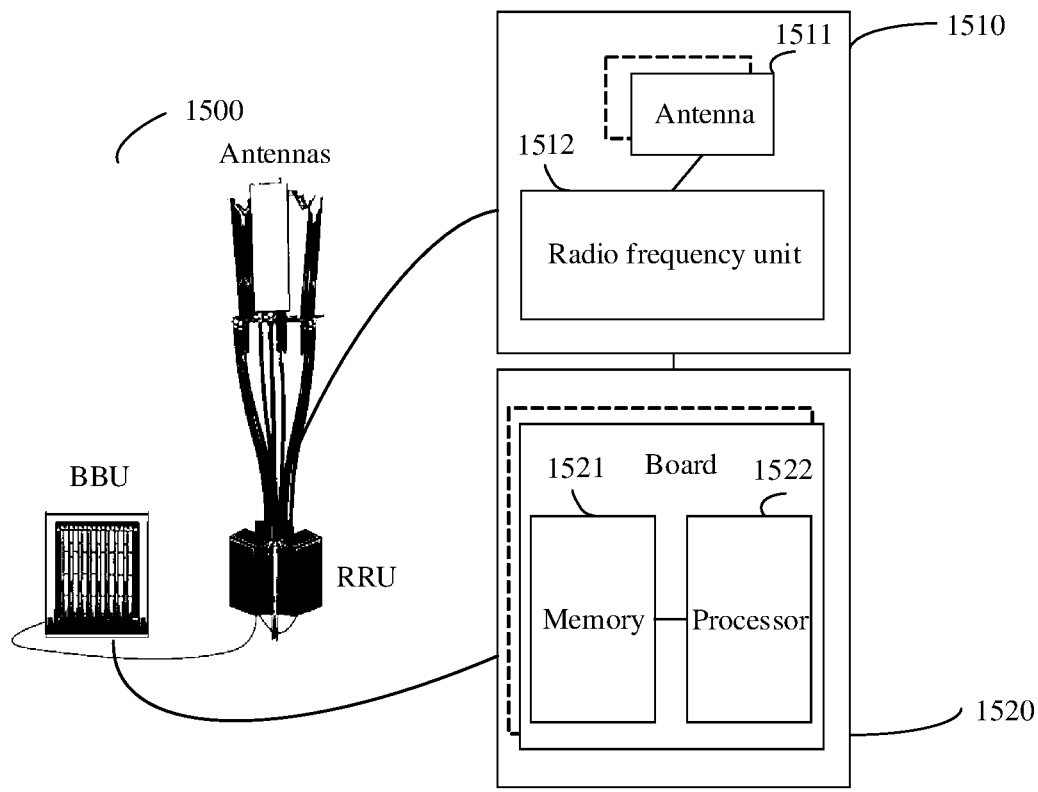
FIG. 15 is still another schematic diagram of a communication apparatus according to an embodiment of this application.

When the apparatus in this embodiment is a network device, the network device may be shown in FIG. 15. An apparatus 1500 includes one or more radio frequency units, for example, a remote radio unit (RRU) 1510 and one or more baseband units (BBU) (which may also be referred to as a digital unit (DU) 1520. The RRU 1510 may be referred to as a transceiver module, and corresponds to the transceiver module 1002 in FIG. 10. Optionally, the transceiver module may also be referred to as a transceiver machine, a transceiver circuit, a transceiver, or the like, and may include at least one antenna 1511 and a radio frequency unit 1512. The RRU 1510 is mainly configured to: send and receive a radio frequency signal, and perform conversion between the radio frequency signal and a baseband signal. For example, the RRU 1510 is configured to send indication information to a terminal. The BBU 1510 is mainly configured to perform baseband processing, control the base station, and the like. The RRU 1510 and the BBU 1520 may be physically disposed together, or may be physically separated, that is, in a distributed base station.

The BBU 1520 is a control center of a base station, and may also be referred to as a processing module. The BBU 1520 may correspond to the processing module 1001 in FIG. 10, and is mainly configured to implement a baseband processing function such as channel encoding, multiplexing, modulation, or spreading. For example, the BBU (processing module) may be configured to control the base station to perform an operation procedure related to the network device in the foregoing method embodiments, for example, generate the foregoing indication information.

In an example, the BBU 1520 may include one or more boards, and a plurality of boards may jointly support a radio access network (such as an LTE network) having a single access standard, or may separately support radio access networks (such as an LTE network, a 5G network, or another network) having different access standards. The BBU 1520 further includes a memory 1521 and a processor 1522. The memory 1521 is configured to store necessary instructions and data. The processor 1522 is configured to control the base station to perform a necessary action. For example, the processor 1522 is configured to control the base station to perform an operation procedure related to the network device in the foregoing method embodiments. The memory 1521 and the processor 1522 may serve one or more boards. In other words, a memory and a processor may be independently disposed on each board. Alternatively, a plurality of boards may share a same memory and a same processor. In addition, a necessary circuit may further be disposed on each board.

It should be understood that, the processor in the embodiments of the present invention may be a central processing unit (CPU), or may be another general-purpose processor, a digital signal processor (DSP), an application-specific integrated circuit (ASIC), a field programmable gate array (FPGA) or another programmable logic device, discrete gate, or transistor logic device, a discrete hardware component, or the like. The general-purpose processor may be a microprocessor, or the processor may be any conventional processor or the like.

It should further be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (storage module) is integrated into the processor.

It should be noted that the memory described in this specification aims to include but is not limited to these memories and any memory of another proper type.

It should further be understood that "first", "second", "third", "fourth", and various numbers in this specification are merely used for differentiation for ease of description, and are not construed as a limitation to the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of this application, sequence numbers of the foregoing processes do not mean execution sequences. The execution sequences of the processes should be determined based on functions and internal logic of the processes, and should not be construed as any limitation to the implementation processes of the embodiments of the present invention.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, used in a terminal, the method comprising:
performing measurement in a measurement gap; and
determining whether to conduct uplink transmission in a period of time, wherein the period of time starts from an end of the measurement gap, a length of the period of time is based on a timing advance for uplink transmission and a subcarrier spacing, and the length of the period of time is a step function of the timing advance.

2. The method according to claim 1, wherein a smaller value of the timing advance corresponds to a smaller value of the length of the period of time.

3. The method according to claim 1, wherein:
TA E∈[0, a-x), and TL=a; or
TA E∈[a-x, b-x], and TL=b; and
wherein TA is the timing advance, TL is the length of the period of time, a=Ns, b=a+Ms, N and M are positive integers, s is one slot length, and x is a margin.

4. The method according to claim 1, wherein the subcarrier spacing is a parameter of a serving cell of the terminal.

5. The method according to claim 1, wherein a plurality of serving cells are configured for the terminal, and wherein each serving cell of the plurality of serving cells corresponds to a respective period of time, and wherein for each serving cell a length of the respective period of time is determined based on a subcarrier spacing of a corresponding serving cell.

6. A method, used in a network device, the method comprising:
generating scheduling information, wherein the scheduling information schedules a terminal in a manner that avoids scheduling the terminal to conduct uplink transmission in a period of time, and wherein the period of time starts from an end of a measurement gap, a length of the period of time is based on a timing advance for uplink transmission and a subcarrier spacing, and the length of the period of time is a step function of the timing advance, and wherein the measurement gap is a time period in which the terminal performs measurement; and
sending the scheduling information to the terminal.

7. The method according to claim 6, wherein a smaller value of the timing advance corresponds to a smaller value of the length of the period of time.

8. The method according to claim 6, wherein:
TA E∈[0, a-x), and TL=a; or
TA E∈[a-x, b-x], and TL=b; and
wherein TA is the timing advance, TL is the length of the period of time, a=Ns, b=a+Ms, N and M are positive integers, s is one slot length, and x is a margin.

9. The method according to claim 6, wherein the subcarrier spacing is a parameter of a serving cell of the terminal.

10. An apparatus, configured in a terminal or being a terminal, the apparatus comprising:
a communication interface; and
one or more processors, configured to execute the following:
performing measurement in a measurement gap; and
determining whether or not to conduct uplink transmission in a period of time, wherein the period of time starts from an end of the measurement gap, a length of the period of time is based on a timing advance for uplink transmission and a subcarrier spacing, and the length of the period of time is a step function of the timing advance.

11. The apparatus according to claim 10, wherein a smaller value of the timing advance corresponds to a smaller value of the length of the period of time.

12. The apparatus according to claim 10, wherein:
TA E∈[0, a-x), and TL=a; or
TA E∈[a-x, b-x], and TL=b; and
wherein TA is the timing advance, TL is the length, a=Ns, b=a+Ms, N and M are positive integers, s is one slot length, and X is a margin.

13. The apparatus according to claim 10, wherein the subcarrier spacing is a parameter of a serving cell of the terminal.

14. The apparatus according to claim 10, wherein a plurality of serving cells are configured for the terminal, and wherein each serving cell of the plurality of serving cells corresponds to a respective period of time, and wherein for each serving cell of the plurality of serving cells a length of the respective period of time is determined based on a subcarrier spacing of a corresponding serving cell.

15. An apparatus, configured in a network device or being a network device, the apparatus comprising:
a communication interface; and
one or more processors, configured to execute the following:
generating scheduling information, wherein the scheduling information schedules a terminal in a manner that avoids scheduling the terminal to conduct uplink transmission in a period of time, and wherein the period of time starts from an end of a measurement gap, a length of the period of time is based on a timing advance for uplink transmission and a subcarrier spacing, and the length of the period of time is a step function of the timing advance, and wherein the measurement gap is a time period in which the terminal performs measurement; and
sending the scheduling information to the terminal.

16. The apparatus according to claim 15, wherein a smaller value of the timing advance corresponds to a smaller value of the length of the period of time.

17. The apparatus according to claim 15, wherein:
TA E∈[0, a-x), and TL=a; or
TA E∈[a-x, b-x], and TL=b; and
wherein TA is the timing advance, TL is the length of the period of time, a=Ns, b=a+Ms, N and M are positive integers, s one slot length, and x is a margin.

18. The apparatus according to claim 15, wherein the subcarrier spacing is a parameter of a serving cell of the terminal.

* * * * *

UNITED STATES PATENT AND TRADEMARK OFFICE
CERTIFICATE OF CORRECTION

PATENT NO. : 12,021,790 B2
APPLICATION NO. : 17/380320
DATED : June 25, 2024
INVENTOR(S) : Han et al.

It is certified that error appears in the above-identified patent and that said Letters Patent is hereby corrected as shown below:

In the Claims

In Column 29, in Claim 3, Line 14, delete "TA E∈[0," and insert -- TA∈[0, --.

In Column 29, in Claim 3, Line 15, delete "TA E∈[a-x," and insert -- TA∈[a-x, --.

In Column 29, in Claim 8, Line 46, delete "TA E∈[0," and insert -- TA∈[0, --.

In Column 29, in Claim 8, Line 47, delete "TA E∈[a-x," and insert -- TA∈[a-x, --.

In Column 30, in Claim 12, Line 13, delete "TA E∈[0," and insert -- TA∈[0, --.

In Column 30, in Claim 12, Line 14, delete "TA E∈[a-x," and insert -- TA∈[a-x, --.

In Column 30, in Claim 17, Line 49, delete "TA E∈[0," and insert -- TA∈[0, --.

In Column 30, in Claim 17, Line 50, delete "TA E∈[a-x," and insert -- TA∈[a-x, --.

In Column 30, in Claim 17, Line 53, delete "s one" and insert -- s is one --.

Signed and Sealed this
Sixth Day of August, 2024

Katherine Kelly Vidal
*Director of the United States Patent and Trademark Office*